United States Patent
Ledford

(10) Patent No.: US 8,219,751 B2
(45) Date of Patent: Jul. 10, 2012

(54) METHODS FOR OPTIMIZING PERFORMANCE OF TRANSIENT DATA CALCULATIONS

(75) Inventor: Douglas Ledford, Apex, NC (US)

(73) Assignee: Red Hat, Inc., Raleigh, NC (US)

( * ) Notice: Subject to any disclaimer, the term of this patent is extended or adjusted under 35 U.S.C. 154(b) by 324 days.

(21) Appl. No.: 12/714,384

(22) Filed: Feb. 26, 2010

(65) Prior Publication Data

US 2011/0213923 A1 Sep. 1, 2011

(51) Int. Cl.
*G06F 12/00* (2006.01)
(52) U.S. Cl. ......... 711/114; 711/119; 711/122; 711/170
(58) Field of Classification Search .................. 711/114, 711/119, 122, 170
See application file for complete search history.

(56) References Cited

U.S. PATENT DOCUMENTS

| 6,397,267 B1 * | 5/2002 | Chong, Jr. ............... 710/1 |
| 2006/0206661 A1 * | 9/2006 | Gaither ............... 711/114 |

* cited by examiner

*Primary Examiner* — John Lane
(74) *Attorney, Agent, or Firm* — Lowenstein Sandler PC

(57) ABSTRACT

A redundant array of independent disk (RAID) stack loads a parity block of RAID data from a main memory into a first register of a processing device and loading the parity block into a cache memory of the processing device. The RAID stack loads a first data block of the RAID data from the main memory into a second register of the processing device without loading the first data block into the cache memory of the processing device. The processing device performs a first parity calculation based on the parity block of the first register and the first data block of the second register.

21 Claims, 9 Drawing Sheets

METHODS FOR OPTIMIZING PERFORMANCE OF TRANSIENT DATA CALCULATIONS

RELATED APPLICATIONS

This application is related to the following co-pending U.S. patent applications: 1) U.S. patent application Ser. No. 12/714,387, filed Feb. 26, 2010, entitled "Methods for Adapting Performance Sensitive Operations to Various Levels of Machine Loads"; 2) U.S. patent application Ser. No. 12/714,388, filed Feb. 26, 2010, entitled "Methods for Reducing Cache Memory Pollution during Parity Calculations of RAID Data"; and 3) U.S. patent application Ser. No. 12/714,391, filed Feb. 26, 2010, entitled "Methods for Determining Alias Offset of a Cache Memory". The disclosure of the above applications is incorporated by reference herein in its entirety.

TECHNICAL FIELD

The present invention relates generally to computer systems. More particularly, this invention relates to optimizing performance of transient data calculations of a data processing system.

BACKGROUND

Many data processing systems include both a system memory (also referred to as a main memory) and a cache memory (or simply referred to as cache). A cache memory is a relatively high-speed memory that stores a copy of information that is also stored in one or more portions of the system memory. The cache memory can be integrated within a processor (on-chip or on-die) of the data processing system or remain separate from the processor of data processing system. There generally are multiple levels of cache memory with progressively faster speeds and smaller sizes. Commonly the largest level of cache is called Level 3 cache, the next largest is Level 2 cache, and the smallest is Level 1 cache. The Level 1 cache is generally on-die with the CPU, is very small (e.g., commonly only 16 to 32 kilobytes in size), and can not be bypassed. The Level 2 cache is generally also on-die and will be a larger size (commonly 256 kilobytes) and also can not be bypassed. The level 3 cache is the largest cache, commonly anywhere from 512 kilobytes to as much as 8 megabytes. For the remainder of this application, when a reference is made to bypassing cache memory and avoiding cache pollution, it is the highest level of cache, typically Level 3 cache, that is being referred to.

Most applications passively benefit from cache memory of a data processing system in order to speed up their performance. However, a cache memory is relatively expensive and typically small in size. Furthermore, cache memory is only of benefit when it is used to store data that is accessed multiple times. If data that will only be accessed once is loaded into cache memory, the benefit of cache memory is not utilized as the initial load of data into cache, which happens automatically on first access of the data, is no faster than main memory. It is only the second and subsequent accesses of the data that benefit from the higher speed of the cache memory. Due to the relatively small size of cache memory, very shortly after start up of a data processing system (usually within milliseconds of initial boot up), the cache memory will already be full. From that point on, every load of data into cache memory requires the eviction of some other piece of data from cache memory.

Because shortly after startup the cache memory of a system is already full and all subsequent loads of data into cache evict something else, the term "cache pollution" was coined to signify those times when a useful piece of data that benefits from being in the cache memory is evicted by a piece of data that will only be used once and will not benefit from being in cache memory.

Since an application suffers a significant performance penalty if its commonly accessed data is the victim of cache pollution, a significant performance benefit can be utilized by instructing the data processing system not to load data that will only be accessed a single time into the cache memory and thereby avoid the cache pollution. The technique to do this is commonly called a prefetch operation. The prefetch instruction causes the processing unit of the data processing system to attempt to retrieve the data without polluting the cache memory.

It is important to note that if the data must be written back to main memory, and it was loaded using a prefetch cycle and cache pollution was successfully avoided, then the data must also be written back to main memory using a non cache polluting technique. A normal write of the data will send the data through all levels of the cache memory, thereby undoing the benefit gained in avoiding the cache memory on the data load cycle. The technique commonly used to do this is to substitute a non cache polluting processor instruction in place of the typical instruction. Eg: MOVNTPS for MOVAPS where NT stands for Non Temporal and is Intel specific nomenclature for data you know will not be used again and should not be allowed to pollute the cache.

The usage of the prefetch operation is not without possible pitfalls. The prefetch operation is a non-blocking CPU operation, meaning that if it does not succeed by the time the data being prefetched is needed by the CPU, the CPU will not consider the condition an error and will continue with operation. However, if the data is not present when the CPU needs it, then the normal data retrieval mechanism in the CPU is immediately triggered and the data will be loaded into all levels of cache memory despite the prefetch operation. This negates the effect of the prefetch operation entirely.

In addition, even though the prefetch operation is non-blocking and will not stall the CPU, it is not free in terms of CPU cycles, memory bus cycles, or other CPU resources. This means that any time a prefetch operation is attempted but the data is not retrieved before the CPU is ready for it, the net effect is that you lose the benefit of the prefetch but still consume the resources of the prefetch. As a result, large numbers of failed prefetch operations actually have a negative impact on overall system performance compared to not attempting any prefetch operations at all and simply allowing transient data to pollute all levels of the cache memory. For this reason it is important that the prefetch operation be issued sufficiently early so that it can complete prior to the CPU being ready for the data being prefetched.

Similarly, if the data is prefetched successfully, but not used very soon, it can end up being evicted from the level of cache it was prefetched to by the time the CPU is ready for it. This is also not an error condition, and this also triggers the CPU's normal memory load cycle. However, this condition is even worse then a prefetch that hasn't completed yet in the sense that this prefetch completed and was subsequently thrown away and then the normal CPU memory load cycle was performed, so the memory being prefetched was read from main memory into cache twice, effectively doubling the load on the bus between main memory and the CPU.

Since it is important that the prefetch operation be performed at the optimal time relative to when the CPU will need the data being prefetched, applications that use the prefetch technique are optimized to find the best point in time to prefetch data. However, the optimal interval varies due to several factors: memory load at the time the prefetch operation is performed, ratio of main memory speed to CPU speed, memory controller in use, etc. Most (if not all) applications simply hard code what they found an optimal prefetch interval to be on their specific test platform(s) under static loading conditions. Failure to account for varying system conditions and adapt to those conditions at run time can cause even well tuned prefetch operations to fail more often than they succeed.

The use of cache bypassing writes is also not without pitfalls. While a prefetch operation is not CPU blocking, a cache bypassing write is. CPUs commonly have a queue to put cache bypassing writes into, if that queue is full when a cache bypassing write is issued, the CPU will stall until a spot frees up in the queue. How fast that queue can drain entries is dependent on the same factors that effect prefetch latency intervals. If a write is instead issued using the normal instruction, then it will go into cache memory immediately and will not stall the CPU. In addition, the cache memory is able to flush contents back to main memory when there is available memory bandwidth, thereby making use of memory bandwidth that would have otherwise gone un-utilized. This increases overall memory efficiency.

Existing systems use one of two methods for dealing with software raid xor operations. They either do not use any cache bypass methods at all, or they use both cache bypassing loads and cache bypassing stores. And when they do use cache bypassing operations, they do not use run time optimized values, they use statically tuned prefetch operations.

Further, when data is loaded into cache memory, it's location in cache memory is directly dependent upon it's location in main memory as there is a mapping function in the cache memory controller that maps from main memory addresses to cache memory sets. Cache memory sets are referred to as N-way, where N is a number between a minimum of 2 and currently a high of 24. 4-way, 8-way, and 16-way set associative caches are the most commonly used cache memory currently. An 8-way set associative cache memory will have 8 slots in a given set to hold data in cache memory. Since all memory addresses map directly to a set, any two addresses that map to the exact same set are called aliases of each other. The cache can never hold more than N aliases at a time. If memory addresses A and B are aliases for each other, and A is already loaded into cache memory, then when the CPU loads address B into cache it would map to the same cache set as address A and it's value would possibly replace A in cache memory, thereby evicting A from cache. Applications commonly attempt to avoid allocating memory at alias offsets, especially if they anticipate ever wanting to use both pieces of memory at the same or similar points in time. No software xor implementations today make use of cache alias effects to reduce the impact of their cache pollution.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
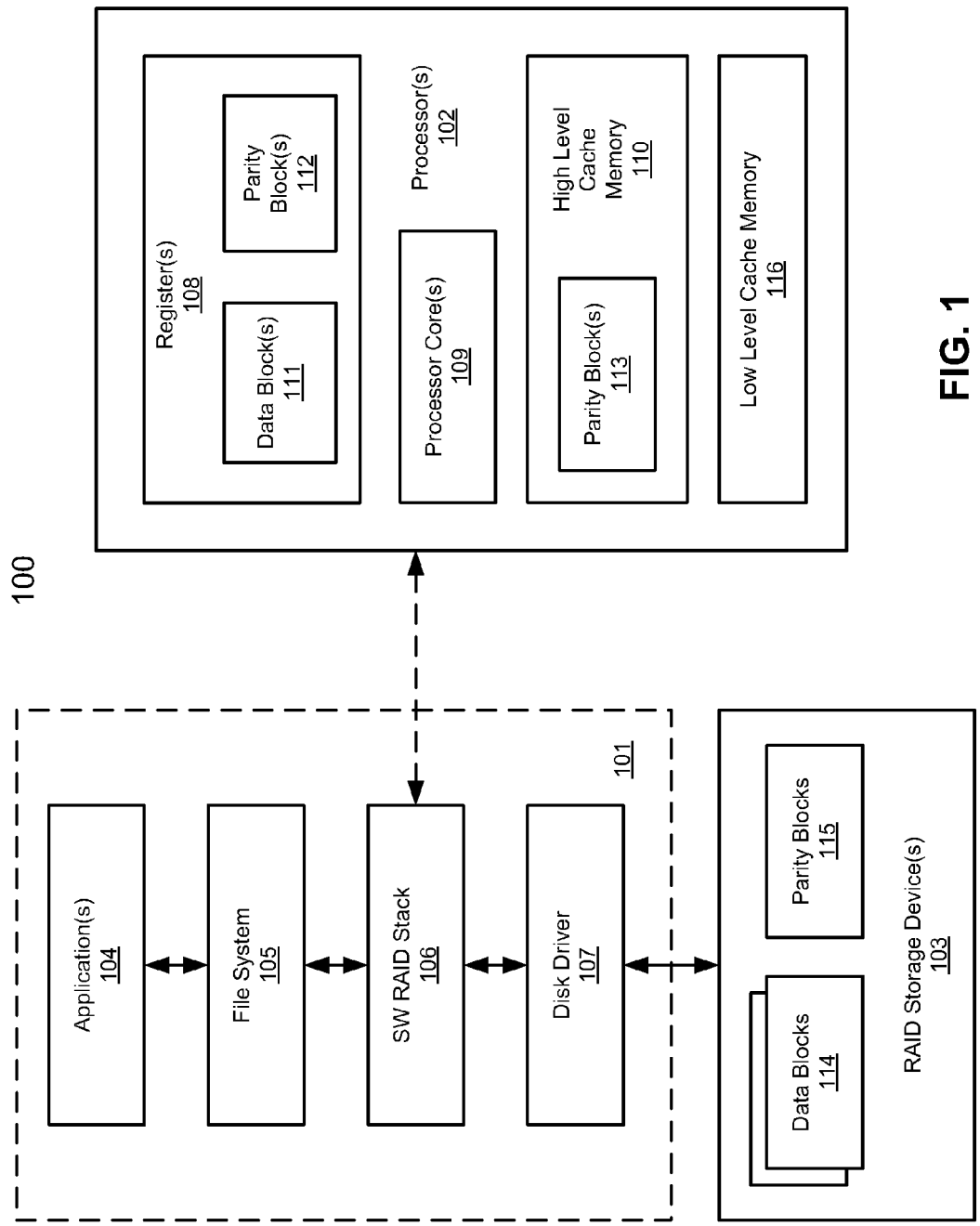
FIG. 1 is a block diagram illustrating a data processing system for data calculations according to one embodiment.

According to some embodiments of the invention, the techniques used herein are to optimize memory access patterns in a data processing system in order to minimize the effect of memory page switch overhead and to maximize utilization of total available main memory bandwidth in the main memory subsystem of the data processing system.

In the following description, numerous details are set forth to provide a more thorough explanation of the embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

According to one embodiment, when performing parity calculations of RAID data of a RAID system, the system will optimize hardware memory system accesses by choosing not to access all data blocks simultaneously and instead will access large chunks of individual data blocks sequentially. This difference can be easily seen in the following code:

An example of pseudo code for simultaneous data block access is illustrated as follows:

```
static void
xor_1parity_4data(unsigned long bytes, unsigned
long *parity, unsigned long *data1,
    unsigned long *data2, unsigned long *data3, unsigned long *data4)
{
    long loops = bytes / (sizeof (long));
    do {
        *parity ^= *data1 ^ *data2 ^ *data3 ^ *data4;
        parity++;
        data1++;
```

-continued

```
    data2++;
    data3++;
    data4++;
  } while (--loops > 0);
}
```

Example of discreet, sequential data block access:

```
static void
xor_depth_func(unsigned long size, unsigned long *parity,
        unsigned long **data, int num_data_blocks)
  {
    int current_data_block=0;
    do {
      unsigned long *p = parity;
      unsigned long *d = data[current_data_block];
      long loops = size / (sizeof (long));
      do {
        *p = *d;
        p++;
        d++;
      } while (--loops > 0);
    } while (++current_data_block < blocks);
  }
```

This method of memory access is more efficient as the first code sample is actually a pathological case of main memory access. Main system memory is divided up into memory pages. Any time main system memory must switch from one page to another in order to satisfy a memory request, there is a switch overhead that is encountered that adds latency to the memory access. The first code sample triggers this additional page switch latency with each actual access to main memory. In the second code sample, because we load the parity block into cache memory, the second and subsequent passes over data blocks do not actually incur a main memory access for the parity block, only for the data block, and this allows the data block access to appear to be the only memory operation in progress according to the main system memory, and streaming access to sequential memory locations is the most efficient means of accessing main memory.

Therefore, the second method of performing xor calculations is the more efficient of the two. It is worth noting that parity blocks can be rather large (in excess of 256 kilobytes) and that when a parity block is large enough, sequentially accessing the entire parity block might cause you to attempt to load more data into cache memory than you have room for. In that case, the embodiment would require performing the parity calculations in a series of discreet steps small enough to keep the parity in cache memory and large enough to reap the benefit of the sequential memory access pattern on the data blocks. Emperical testing has shown that discreet units of 512, 4096, 8192, and 16384 bytes all work well on modern personal computer class processing systems. Optimum values will depend on the hardware in use in any given application of this embodiment.

According to one embodiment, when performing parity calculations of RAID data of a RAID system, a parity block is loaded into both a register and a cache memory of a processor, while a data block is loaded into a register only. The technique used to instruct the central processor to do this is system hardware specific, but it is generally referred to as 'prefetch'ing the data from main memory into the lowest level of cache allowed by the CPU. It is generally not possible to prefetch data directly into a processors registers, it must first go through one or more lower layers of cache. However, when storing data it is possible to bypass the cache entirely and go directly from register to main memory. An example of how to do this is to use the MOVNTPS instruction instead of the MOVAPS instruction on Intel compatible x86 processors, where the NT in the operation stands for Non-Temporal and is Intel specific nomenclature that denotes data that is desirable to exclude from cache memory. Modern embodiments usually are either completely ignorant of their cache footprints (in which case they resemble the sample code from item 0027), or they use the cache pollution avoidance techniques on both the parity block and all data blocks.

An example of pseudo code representing a method that avoids polluting the cache on both reads and writes and for both parity and data blocks is included here:

```
offset = 0;
prefetchnta parity;
prefetchnta data1;
prefetchnta data2;
movaps xmm0, parity;
prefetchnta data3;
movaps xmm1, parity+16;
prefetchnta parity+64;
prefetchnta data1+64;
movaps xmm2, parity+32;
prefetchnta data2+64;
prefetchnta data3+64;
movaps xmm3, parity+48;
do {
  prefetchnta parity+offset+128;
  xorps xmm0, data1+offset;
  prefetchnta parity+offset+192;
  xorps xmm0, data2+offset;
  xorps xmm0, data3+offset;
  prefetchnta data1+offset+128;
  xorps xmm1, data1+offset+16;
  prefetchnta data1+offset+192;
  xorps xmm1, data2+offset+16;
  xorps xmm1, data3+offset+16;
  prefetchnta data2+offset+128;
  xorps xmm2, data1+offset+32;
  xorps xmm2, data2+offset+32;
  prefetchnta data2+offset+192;
  xorps xmm2, data3+offset+32;
  prefetchnta data3+offset+128;
  xorps xmm3, data1+offset+48;
  xorps xmm3, data2+offset+48;
  prefetchnta data3+offset+192;
  xorps xmm3, data3+offset+48;
  movntps parity+offset, xmm0;
  movntps parity+offset+16, xmm1;
  movntps parity+offset+32, xmm2;
  movntps parity+offset+48, xmm3;
} while ((offset += 64) < size);
```

The method illustrated here avoids cache pollution, including when writing the final results to memory. The embodiment as envisioned avoids cache pollution for all data blocks (and hence would use the prefetchnta instruction on data blocks), it does not avoid cache pollution for the parity block (and would therefore not use the prefecthnta instruction on the parity block, and would not use the MOVNTPS instruction to the store the result). As a result, all data blocks are treated as transient data while the parity block is treated as persistent data. Since a depth first processing of data as indicated above requires the parity block to be accessed multiple times, once for each data block, while each data block is loaded exactly once and never stored back into main memory, it is more efficient to load the parity block in the cache memory of the processor such that the parity block does not have to be reloaded from the main memory for each subsequent parity calculation. In addition, since the process of storing the results of the parity calculations back into main memory only happens on the parity block and not on any of the data blocks, loading the parity block into cache memory allows the hardware to perform optimized writes of the final parity result back to main memory as opposed to attempting to use cache bypassing writes directly from the central processors registers to main memory which can stall the processor and result in performance degradation.

In addition, according to one embodiment, prior to performing parity calculation of the RAID data (and possibly also at regular intervals during the parity calculation depending on the length of calculation to be performed and the need for adjustments during the time the calculation takes), tests are performed to assess the current load on the main memory subsystem. From this load assessment, the embodiment will determine an optimum prefetch distance to use in order to ensure that the data is present in lower level cache when needed and that a cache miss and subsequent normal memory load are not performed. This embodiment could use either multiple static routines with predefined prefetch offsets, a single routine with a variable offset read ahead loop, or a master routine that would call any of various sub-routines at regular intervals. The most optimal memory access routine or prefetch distance is selected to be used to load subsequent data from the memory at that specific point in time in order to adjust parity calculation to varying main memory load conditions so as to further improve parity calculation.

Further, the aliasing effects of a cache memory are utilized to minimize the cache pollution when loading a parity block into the cache memory. Specifically, according to one embodiment, a parity block is intentionally allocated at a memory address that is offset from a previous parity block's memory address that is one or more multiples of the alias offset of the cache memory. Therefore, whenever a parity block is loaded from the main memory, the parity block always is loaded into the same cache set of the cache memory. As a result, when a new parity block is loaded into the cache memory, we are most likely to bump, or kick out from the cache memory, a previously used parity block without affecting other data stored in the cache memory (e.g., less cache pollution). This effect may also be used within a single parity block to reduce the cache pollution of a single parity block. By dividing the parity block into smaller segments, quite possibly the same sized segments as listed in 0031 above, and then making sure that those segments are not sequential in memory but instead are offset at cache alias addresses, the overall cache footprint of even a single parity block can be reduced to no more than the size of the segment the parity block was divided into.

Furthermore, because the number levels of cache memory, and the size of each cache memory effect the optimal cache alias, and because various processing units therefore use different cache aliases based upon their construction, and because newly released processing units may introduce totally new cache alias offsets at any given point in time, instead of statically assuming an alias offset of a cache memory based upon a list of known processor and cache alias combinations, a test routine is provided to "walk" through the memory to determine at run time the alias offset of a particular cache memory. The determined alias offset may be used to minimize the cache pollution when performing parity calculations of RAID data.

Optimal Performance of Calculations on Transient Data

Data is either transient or persistent. Transient data is data that is only used once and then never again, and therefore does not benefit from cache memory. Persistent data is data that will be used more than once, and therefore does benefit from cache memory. By default, all data is treated as persistent. It is up to the software engineer to identify transient data in use in a program and to modify the program to cause it to treat the data as transient by using non cache polluting loads and stores on the transient data.

A software (SW) redundant array of independent disk (RAID) stack is a special case all itself because, although the data being written to disk might have been persistent in nature when it was in use by the application, the writes from the application are buffered for a time before being actually written to disk and the data is most likely already evicted from cache memory. This fact combined with the fact that the RAID stack will never do any work on the data except for a single operation make what might have been persistent data at the time the data was created transient data by the time it is being written to disk by the RAID subsystem. The current LINUX software RAID stack treats data as transient and uses non-cache polluting processor instructions when a processor supports it. This change is about redefining the data type to be part transient and part persistent. Given that an exclusive OR (XOR) parity calculation is to be performed on an arbitrary number of data blocks, each of the data blocks shall be treated as transient data as they are only accessed once, while the parity block that holds the initial starting parity and the final parity result shall be treated as persistent.

Conventionally, the parity block is treated as a transient data block because the implementation utilizes a breadth first parity calculation algorithm. Under the breadth first parity calculation approach, the parity block's byte 0 is loaded first, then data block 0's byte 0 and XORed with the parity block's byte 0. Data block 1's byte 0 is then loaded and XORed into the previous result. Data block 2's byte 0 is then loaded and XORed into the previous result. When all the data blocks have been XORed into the parity block, the finished parity byte 0 is stored. Then parity byte 1 is loaded and the above process is repeated for byte 1 of each data block and then the final parity byte 1 is stored at the end of this loop, except replace byte with whatever the optimum data size is given the processor (e.g., CPU or central processing unit) in use. It must be breadth first because the XOR routine does not want to ever have to reload the same parity byte. Rather, it wants to finish with it completely and store it off before moving on to the next byte.

A depth first approach to this problem would be different. The parity byte 0 is loaded into a register first, then the data block 0 byte 0 is loaded and an XOR operation is performed. The result is saved back into the parity byte 0's memory location. The parity byte 1 and data block 0 byte 1 are loaded, the process repeats. This process is repeatedly performed until the parity calculation of all of data block 0 has been performed. Then the process would loop back and load the original parity block byte 0 again, then load data block 1's byte 0 and XOR them together. The process would then save that result back into the parity memory location. This would again repeat until data block 1 was complete. This process will repeat for however many data blocks there are.

The important aspect of this is that the parity data is reloaded over and over again and each data block is loaded exactly once. This makes the parity data no longer transient, but persistent. It, however, leaves each data block as transient. This is being done to optimize memory hardware access. Physical memory in a computer has a switching cost associated with changing physical address page you are accessing. As a result, every time one item is loaded from data block 0, then one item from data block 1, then one item from data block 2, this switching overhead is triggered.

By loading all of data block 1, and then all of data block 2, then all of data block 3, this switching overhead is triggered only once when the process switches from block to block. Therefore, according to one embodiment, treating the parity data as persistent and allowing the parity block, and only the parity block, to pollute the cache allows the process to cheaply load and reload the parity block at a relatively low cost. In addition, treating the data blocks as transient keeps the data blocks from polluting cache. As a result, the system is able to utilize a more efficient algorithm for parity calculations in terms of physical hardware access patterns.

FIG. 1 is a block diagram illustrating a data processing system for data calculations according to one embodiment. Referring to FIG. 1, system 100 includes, but is not limited to, software stack 101 loaded into a machine-readable storage medium such as a memory (e.g., system or main memory, not shown) and executed by processor 102, in this example, for accessing storage device 103. Software stack 101 includes, but is not limited to, one or more applications 104, a file system layer 105, a software RAID stack 106, and a disk device driver 107.

File system 105 can be any kind of file systems. A file system is a mechanism for storing and organizing computer files and the data they contain to make it easy to find and access them. File systems may use a data storage device such as a hard disk or CD-ROM and involve maintaining the physical location of the files. The file systems might provide access to data on a file server by acting as clients for a network protocol, or they may be virtual and exist only as an access method for virtual data. File system 105 provides a set of application programming interfaces (APIs) to allow application 104 to access files stored in storage device 103 via software RAID stack 106 and disk device driver 107.

For the purpose of illustration, a RAID system is utilized as an example of a storage system that can be used with an embodiment of the invention. However, it is not so limited; the techniques described throughout this application can also be applied to other types of systems. RAID is a technology that allows computer users to achieve high levels of storage reliability from low-cost and less reliable disk-drive components, via the technique of arranging the devices into arrays for redundancy. Redundancy is achieved by either writing the same data to multiple drives (e.g., mirroring), or collecting data (e.g., parity data) across the array, calculated such that the failure of one or more disks in the array will not result in loss of data. A failed disk may be replaced by a new one, and the lost data can be reconstructed from the remaining data and the parity data.

A RAID system can be hardware based, software based (also referred to as operating system based), or firmware based. Software implementations are now provided by many operating systems. A software layer, in this example, software RAID stack 106 sits above the disk device driver 107 and provides an abstraction layer between the logical drives (e.g., RAIDs) and physical drives in storage device 103. However, a hardware RAID system can also make use of these techniques in which case the entire RAID stack 106 would be self contained in the storage device 103 and transparent to the operation system of the computing device. It is also possible that these techniques could be used in a firmware based RAID device, in which case the physical disks of storage device 103 would be connected to a specialized disk adapter that performed the RAID function and presented the disks to the disk driver 107 as logical RAID volumes and not as physical disks.

RAID data can be stored across one or more disks of RAID storage device 103, including data blocks 114 and parity blocks 115, dependent upon a specific configuration of the RAID device 103. File system 105, RAID stack 106, and disk device driver 107 may be implemented as a part of an operating system, such as Linux available from Red Hat, Inc. of Raleigh, N.C., Windows™ available from Microsoft Corporation of Redmond, Wash., and Mac OS™ available from Apple Inc. of Cupertino, Calif., etc.

Processor 102 can be any kind of microprocessor, which includes, but is not limited to, one or more registers 108, one or more processor cores 109, and a cache memory 110. Processor 102 may include multiple processors or multiple processor cores. Cache memory 110 may be integrated with processor 102 (e.g., on-die) or alternatively, maintained as a separate chip (e.g., off-chip). Cache memory 110 is used by processor 102 to reduce the average time to access memory. The cache is a smaller, faster memory which stores copies of the data from the most frequently used main memory locations. As long as most memory accesses are cached memory locations, the average latency of memory accesses will be closer to the cache latency than to the latency of main memory.

When a processor needs to read or write a location in main memory, it first checks whether that memory location is in the cache. If the processor finds that the memory location is in the cache, a cache hit has occurred; otherwise, a cache miss has occurred. In the case of a cache hit, the processor immediately reads or writes the data in the cache line. The proportion of accesses that result in a cache hit is known as a hit rate, and is a measure of the effectiveness of the cache.

In the case of a cache miss, caches allocate a new entry, which comprises the tag just missed and a copy of the data from memory. The reference can then be applied to the new entry just as in the case of a hit. Misses are comparatively slow because they require the data to be transferred from main memory. This transfer incurs a delay since the main memory is much slower than cache memory, and also incurs the overhead for recording the new data in the cache before it is delivered to the processor.

In order to make room for the new entry on a cache miss, the cache generally has to evict one of the existing entries. The heuristic that it uses to choose the entry to evict is called the replacement policy. The fundamental problem with any replacement policy is that it must predict which existing cache entry is least likely to be used in the future. Predicting the future is difficult, especially for hardware caches that use simple rules amenable to implementation in circuitry, so there are a variety of replacement policies to choose from and no perfect way to decide among them. One popular replacement policy, LRU, replaces the least recently used entry.

According to one embodiment, when a parity calculation is performed, RAID stack 106 causes processor 102 to simultaneously load a parity block into register 108 as parity block 112 and into cache memory 110 as parity block 113. However, the RAID stack 106 causes processor 102 to prefetch a data block only into cache memory 116, bypassing cache memory 110. As a result, in a depth first approach of parity calculations, a parity block loaded into cache memory 110 can be quickly accessed multiple times without reloading the same parity block from the main memory. In one embodiment, a specific programming instruction can be used to control whether data is to be loaded into a register, a cache memory, or both. For example, under Linux operating environment, an instruction such as MOVAPS may be used to load data into both register 108 and cache memory 110. On the other hand, an instruction sequence such as PREFETCHNTA; MOVAPS may be used to first load the data into cache memory 116, bypassing cache memory 110, then from cache memory 116 into register 108 without loading the same into cache memory 110. Note that some or all of the components as shown in FIG. 1 may be implemented in hardware, software, or a combination of both. An instruction such as MOVNTPS can be used to store the data from register 108 to main memory while bypassing cache memory 110 without the use of the PREFETCH sequence, but may not be used for loading data.

Figure 2:
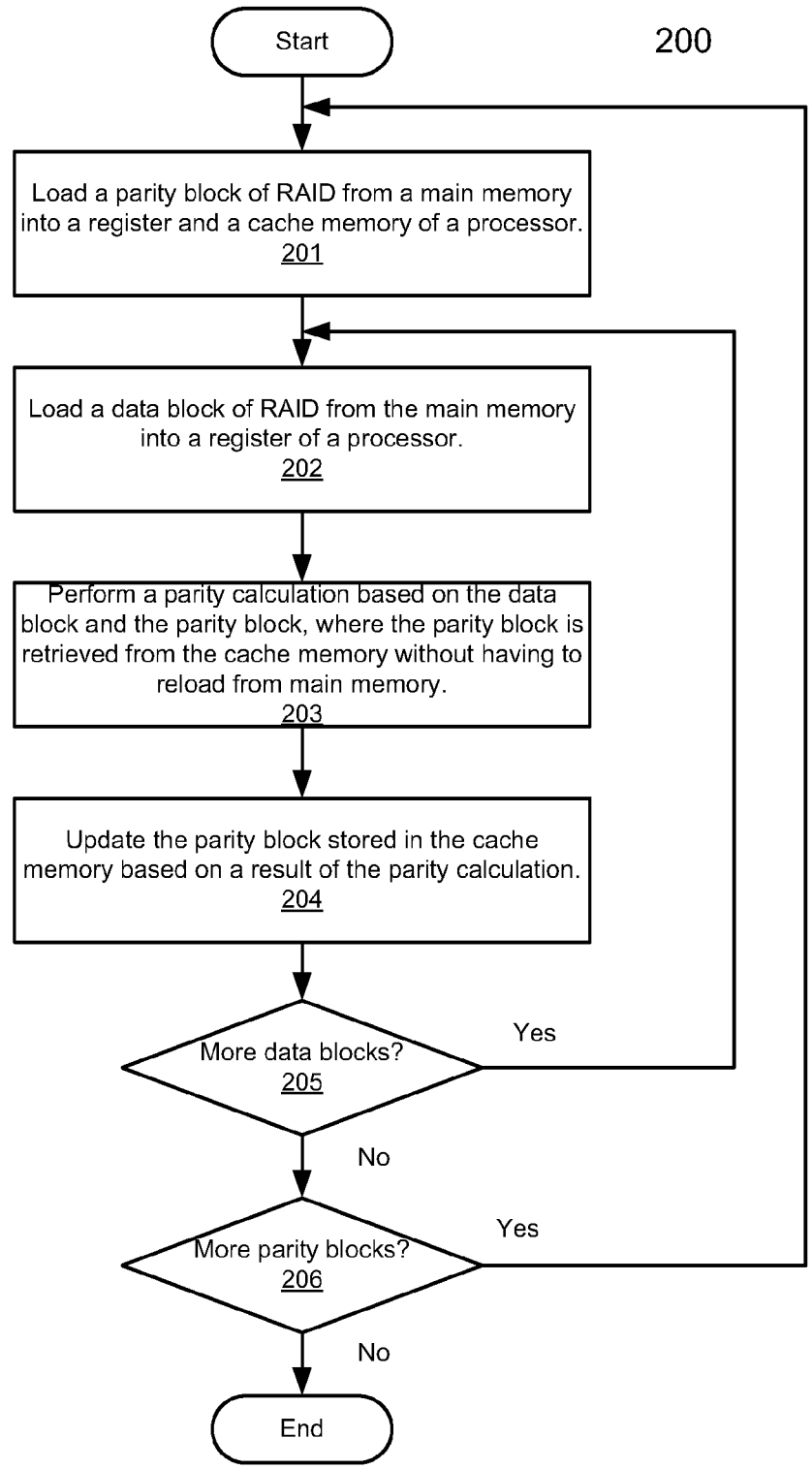
FIG. 2 is a flow diagram illustrating a method for performing parity calculations of RAID data according to one embodiment.

FIG. 2 is a flow diagram illustrating a method for performing parity calculations of RAID data according to one embodiment. Note that method 200 may be performed by processing logic which may include software, hardware, or a combination of both. For example, method 200 may be performed by RAID stack 106 of FIG. 1. Referring to FIG. 2, at block 201, at least a segment of a parity block is loaded from a main memory into a register and a cache memory of a processor. For example, an instruction of MOVAPS may be used to load the data associated with a parity block into both the register and cache memory. At block 202, at least a segment of a data block is loaded from the main memory into a register or a low level of cache only without loading the same into the highest level of cache memory. For example, an instruction sequence of PREFETCHNTA; MOVAPS may be used to load the data associated with the data block into the register without loading the same into the cache memory. It is also possible to utilize the data directly without loading it into a register and without polluting the highest level of cache by using a sequence such as PREFETCHNTA data_address; XORPS xmm0, data_address;. Since the prefetch operation will have loaded the data from data_address into the lower level cache, the subsequent direct memory access will find the data in the lower level cache and use it directly without actually going to main memory. In this way, the need to allocate a register to the data from the data block is avoided entirely. At block 203, a parity calculation is performed based on the loaded parity block and either the loaded data block or the direct memory address of the data block as previously prefetched, where the parity block is retrieved from the cache memory to be XORed with the data block without having to reload the parity block from the main memory. At block 204, the parity block stored in the cache memory is updated in view of a result of the parity calculation. This is done by performing a normal write of the parity data back to the parity data's main memory address. However, since the parity data's main memory address is already in cache memory, the write first goes to cache memory and only out to main memory when the cache memory is ready to evict the parity data from cache memory. Since we will be reusing the parity data in a short period of time, we generally will rewrite the result multiple times in cache memory without it going back out to main memory except once we are completely done with the parity block. At block 205, if there are more data blocks associated with the current parity block remaining, the process involved in blocks 202-204 is repeated. At block 206, a next parity block is loaded into the cache memory (likely evicting a previous parity block and triggering the final write of that parity data to main memory if it hasn't happened already) and the parity calculations described above are performed again until all parity blocks are covered.

Adapting Performance Sensitive Operations Based on Processor Load

As described above, certain programming instruction sequences (e.g., PREFETCHNTA; MOVAPS) can be used to load data in a non-cache polluting manner. Those instructions, in general, are very timing sensitive. If the MOVAPS instruction is issued too soon after the PREFETCHNTA instruction, the data may not be present yet in the lower level cache If the MOVAPS instruction is issued too long after the PREFETCHNTA, the data may arrive too early at the processor and may have already been evicted from the lower level cache. In both of these failure situations, the processor is stalled waiting for a normal data load (e.g., from the main memory) to occur and the normal data load will pollute the cache.

Today, more and more developers have attempted to find an optimal timing for these non-cache polluting loads of data. The problem is that it may be difficult to determine this timing which is based on machine loading at any given point in time. In general, the timing of loading data is considered as a fixed latency issue. For example, if an application needs data at time A, then the application needs to request it at time (A−x) nanoseconds. This calculation is simplistic and incorrect in many cases. The problem is that the attempt to load the data must go from a processor through a memory controller (note: the memory controller may be an on-chip memory controller or separate from the processor) to the main memory and then back again. During that process, the memory controller utilizes a queue for storing memory access requests. Those requests can be coming from the current processor, another processor, from buses such as a peripheral component interconnect (PCI) bus, etc. It is unknown where exactly a particular memory request will land in that queue. It could be at the first location on a relatively quite system; it could be at six or more entries deep on a very heavily loaded system. The memory request's place in the queue will effect the latency of the memory request. Furthermore, variances from data processing system to data processing system, including factors such as the ratio of main memory speed to central processor speed, will work to effect the latency of a memory request and can have a significant impact on how much latency is introduced by each successive level of queue depth in the memory controller. Therefore, a statically optimized function that treats the latency of the memory requests as constant will fail to optimize operations under conditions that vary even just moderately from the conditions under which the corresponding function or routine is optimized.

Many modern processors include various performance monitors or counters accessible to software running in the system, such as, for example, the kernel of an operating system. One of those counters is a cache miss counter or logic. Every time a prefetch operation fails (e.g., too late or too early), a cache miss event will be triggered and the cache miss counter will be incremented. Thus, by monitoring the cache miss counter of a processor while executing a particular memory access routine, it can be determined whether the memory access timing of the routine is appropriate.

According to one embodiment, multiple memory access routines are created to perform substantially the same operation (e.g., loading data from memory). Each memory access routine has different timing characteristics with various latency expectations in its memory request operations (e.g., different instructions and/or different orders of instructions, etc.). Each memory access routine is executed while monitoring, via an API, the cache miss counter to proactively monitor whether the current memory access routine is most optimal routine for the machine's load at the point in time. The most optimal memory access routine is then selected for subsequent memory accesses. Such a process can be performed during initialization of the machine, or preferably it can be performed periodically during run time operation (e.g., in response to a request for parity calculations and even on a regular basis during the performance of a parity calculation as main memory load can vary on a millisecond by millisecond basis).

According to another embodiment, a single memory access routine is created that is capable of varying the timing of prefetch operations in relation to data using operations and the prefetch latency will be varied as described above.

Figure 3:
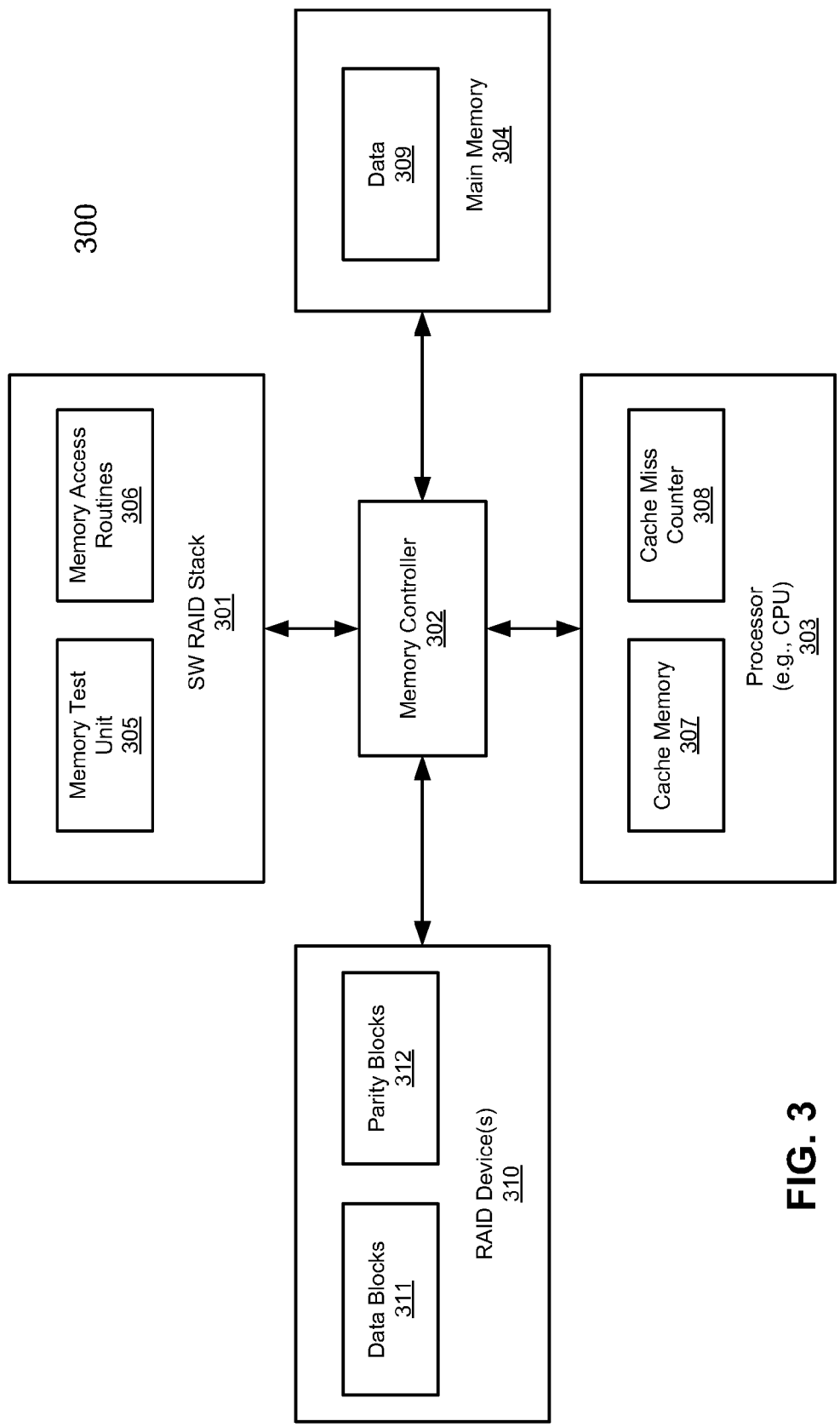
FIG. 3 is a block diagram illustrating a system for determining timing of memory access routines according to one embodiment.

FIG. 3 is a block diagram illustrating a system for determining timing of memory access routines according to one embodiment. System 300 may be implemented as part of system 100 as shown in FIG. 1. Referring to FIG. 3, system 300 includes a software RAID stack 301, processor 303, main memory 304, and (as before, just treat this as physical disks, not a RAID storage device) storage device 310 coupled to each other via a memory controller 302 and one or more buses or interconnects. Similar to system 100 of FIG. 1, storage device 310 is used to store data blocks 311 and parity blocks 312 of RAID data. Any of data blocks 311 and parity blocks 312 can be loaded into main memory 304 as data 309 via the memory controller 302. When data is loaded from memory 304 into a register of processor 303 (not shown) or used via direct memory access with a preceding prefetch operation or with a failed prefetch operation, a copy of the data is stored in the upper level cache memory 307 and the cache miss counter is incremented. Such data can be prefetched into lower level cache memory 313. If the prefetch is successful, subsequent use of the data will not load the data into upper level cache memory 307 and will not trigger a cache miss counter increment.

According to one embodiment, RAID stack 301 includes a cache test unit 305 and multiple memory access routines 306, each having different timing characteristics. The cache test unit 305 is configured to launch each of the memory access routines 306 and to monitor, via an API, the cache miss counter 308 of processor 303 in an attempt to determine which one of the memory access routines is the most appropriate one at that point in time. Typically, a memory access routine that causes the least incremental value of the cache miss counter 308 would be the most optimal routine. Thereafter, the most optimal memory access routine is selected for subsequent memory accesses. In another embodiment, memory test unit 305 will monitor the cache miss counter during normal parity calculation of a running system and may adjust the system to use a different memory access routine at any point in time in response to the main memory load at that given point in time. In another embodiment the memory test unit 305 will determine the typical latency of a memory load that comes from main memory and store that in a variable for later use, then the xor routine of the software RAID stack will, periodically during normal operations, time the amount of time it takes to load transient data and compare it to the stored time to load from main memory. If the sample time is similar or the same as the stored time, then the xor routine will know that it is incurring cache misses and can take steps to adjust the prefetch interval in an attempt to correct the problem.

Note that multiple memory access routines are described herein for the purpose of illustration only. A single routine having certain conditional executable statements or segments, each having different access timing characteristics, may also be utilized. Also note that some or all of the components as shown in FIG. 3 may be implemented in software, hardware, or a combination of both. More or fewer components may also be implemented.

Figure 4:
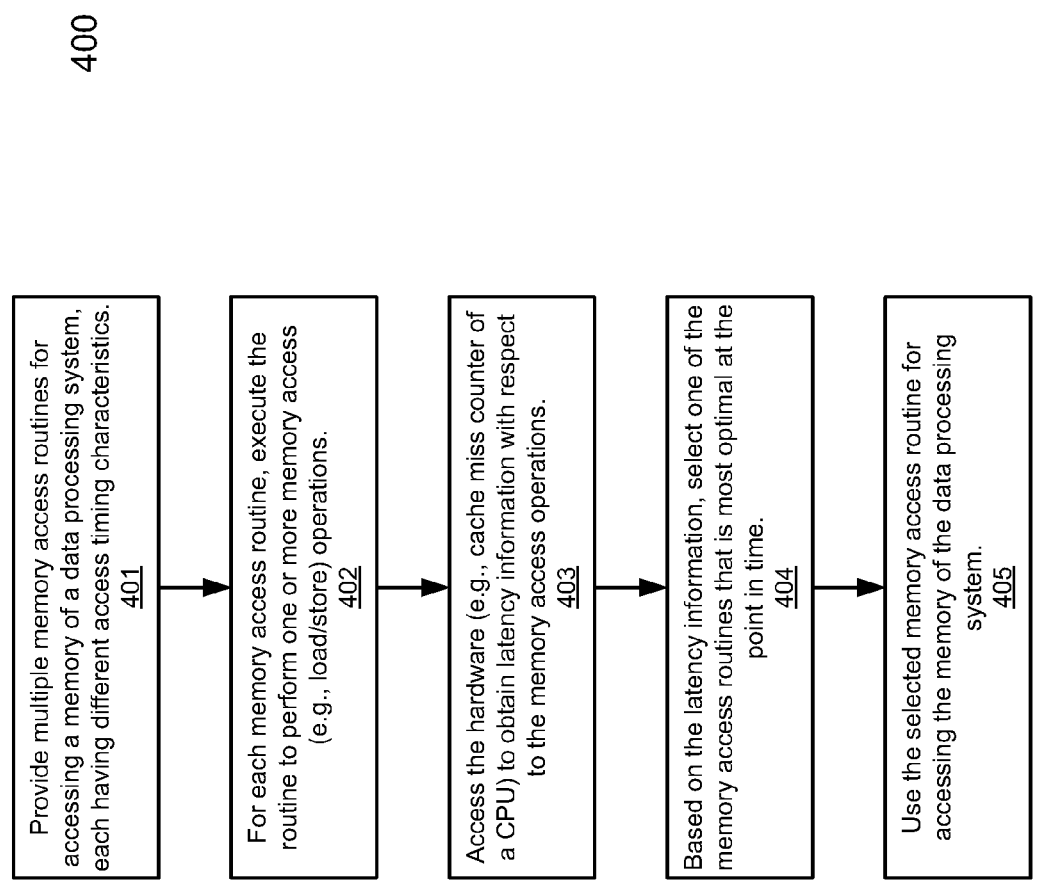
FIG. 4 is a flow diagram a method for determining timing characteristics of a memory access routine according to one embodiment.

FIG. 4 is a flow diagram of a method for determining timing characteristics of a memory access routine according to one embodiment. Note that method 400 may be performed by processing logic which may include software, hardware, or a combination of both. For example, method 400 may be performed by RAID stack 301 of FIG. 3. Referring to FIG. 4, at block 401, multiple memory access routines are provided for accessing a memory of a data processing system, where each memory access routine has different access timing characteristics. At block 402, for each memory access routine, processing logic causes the memory access routine to be executed by a processor of the data processing system performing one or more memory access operations (e.g., load and/or store operations). At block 403, processing logic accesses (e.g., via API) the hardware to obtain cache miss information for a given routine, and from that infers whether the latency characteristics of the specific memory access routine are suitable for the specific data processing system. Based on the cache miss information of each memory access routine, at block 404, one of the memory access routines having the most appropriate latency characteristics for the specific data processing machine is selected. At block 405, the selected memory access routine is used to perform subsequent memory access operations. As a result, the efficiency of the memory accesses is greatly improved.

The tests and conclusions represented in FIG. 4 may be performed once at system start up (which will adjust the memory access routines suitably for different models of data processing system, but not for varying load conditions of a single data processing system), or more preferably, on a regular basis during ongoing operations of the data processing system (which achieves the result of compensating for varying memory loads on a data processing system in addition to vary characteristics of different data processing systems).

Minimization of Cache Pollution

As described above, it will be more efficient to load parity blocks in the upper level of cache memory and to load the data blocks only in the lowest levels of cache memory or processor registers since the parity blocks are accessed multiple times and the data blocks are accessed exactly once. However, in general, since the cache memory is a very limited resource, it is desirable to keep the cache memory pollution by the parity data minimal.

Most general purpose processors implement some form of N-way set associative cache memory mapping. This method of cache population is a trade off between a fully associative cache memory, which is highly complex and hard to build in silicon, and direct mapping which is very simplistic and easy to build in silicon, but also generally poor performing. In an N-way set associative cache, the cache memory is divided into cache lines (usually 64 or 128 bytes in size) and each set is comprised of N lines. The total number of sets is determined by the overall size of the cache memory divided by the size of each set. As an example, a 2 megabyte cache memory that is 8-way set associative and has 128 byte cache lines would be divided into a total of 2048 sets (2048 Kilobytes size/(8*128 bytes)=2048). The system's main memory is then mapped via a static algorithm onto the total number sets provided by the cache memory. How the main memory is mapped onto those sets can be done in several ways. However, one of the most common methods is to use the middle bits of the memory address to identify the set the address belongs to. For example, if you have a 128 byte cache line, then the lowest 7 bits of the memory address can be ignored as they all exist inside a single cache line. It is required that you have 11 bits to represent 2048 sets, so bits 8 through 18 of the memory address can be used to directly map to the set. Bits 19 and above are not considered in determining which set the memory belongs to. Other factors may play a role in these calculations as well, including things such as shared L3 cache on multiprocessor chips that partition the cache into sections dedicated to each processor.

A side effect of N-way set associative caches is that they all suffer to some degree from a phenomena known as cache alias effects. Whenever a program accesses a given memory location, the processor first maps from the memory address to the proper cache set, it then searches that cache set to see if the memory location is already present in the cache, and if not it then initiates a cache load cycle. In an N-way set associative cache, each set has N entries. If the memory address was not found in any of those entries in the set, then the cache must first evict one of the entries from the set before it can load the current entry into the set. Since each set of an N-way set associative cache has N entries, if you attempt to load N+1 aliased memory addresses, then you will necessarily evict one of your previously loaded entries from cache. If you then attempt to go back to that evicted memory location, you will incur the overhead of reloading that data back into cache while also evicting yet another piece of your data from cache. It is common for the lowest levels of cache to only be 4-way set associative and therefore only able to handle at most 4 aliased addresses at a time. Higher level caches commonly range from 8-way to 24-way or more set associative. It is imperative in a mixed transient/persistent data environment to be fully aware of the cache aliasing effects at both the lower and higher level caches. We are attempting to load data blocks only into the lower level caches and must therefore ensure that we don't exceed the capacity of the lower cache or else cache eviction of data blocks from the lower level cache will trigger a normal memory load cycle which will then pollute the higher layers of cache. Similarly, we need to make sure that our parity block preferably resides in both the lower and upper layers of cache so we must be aware of simultaneous aliasing effects in both layers of cache. Finally, once we finish with a specific parity block, it would be best if we could intentionally use an aliased address for the next parity block so we are, at worst, evicting data from the same data sets we have already evicted data from. If possible, we can optimize our parity blocks such that they all occupy the same small number of cache sets and do not occupy the majority of cache sets, allowing us to minimize cache pollution from our parity calculations relative to other running programs and their data needs.

The most straightforward way to determine cache alias offsets is to provide a static mapping from processor model to known cache properties. Using such a table an embodiment could allocate their parity blocks in such a way as to provide the desirable cache aliasing properties. Modern processors also support providing detailed cache information at run time via the CPUID instruction, negating the need for a static table. However, this method still requires a table mapping return codes to features and that table may get out of date when new processors are released.

For older processors that don't support detailed cache information, or for new processors for which our static table is not yet updated to handle all possible return codes, it is possible to determine the cache characteristics of the processor via carefully timed and sequenced memory load operations covering the range of common N-way and cache size combinations.

Figure 5:
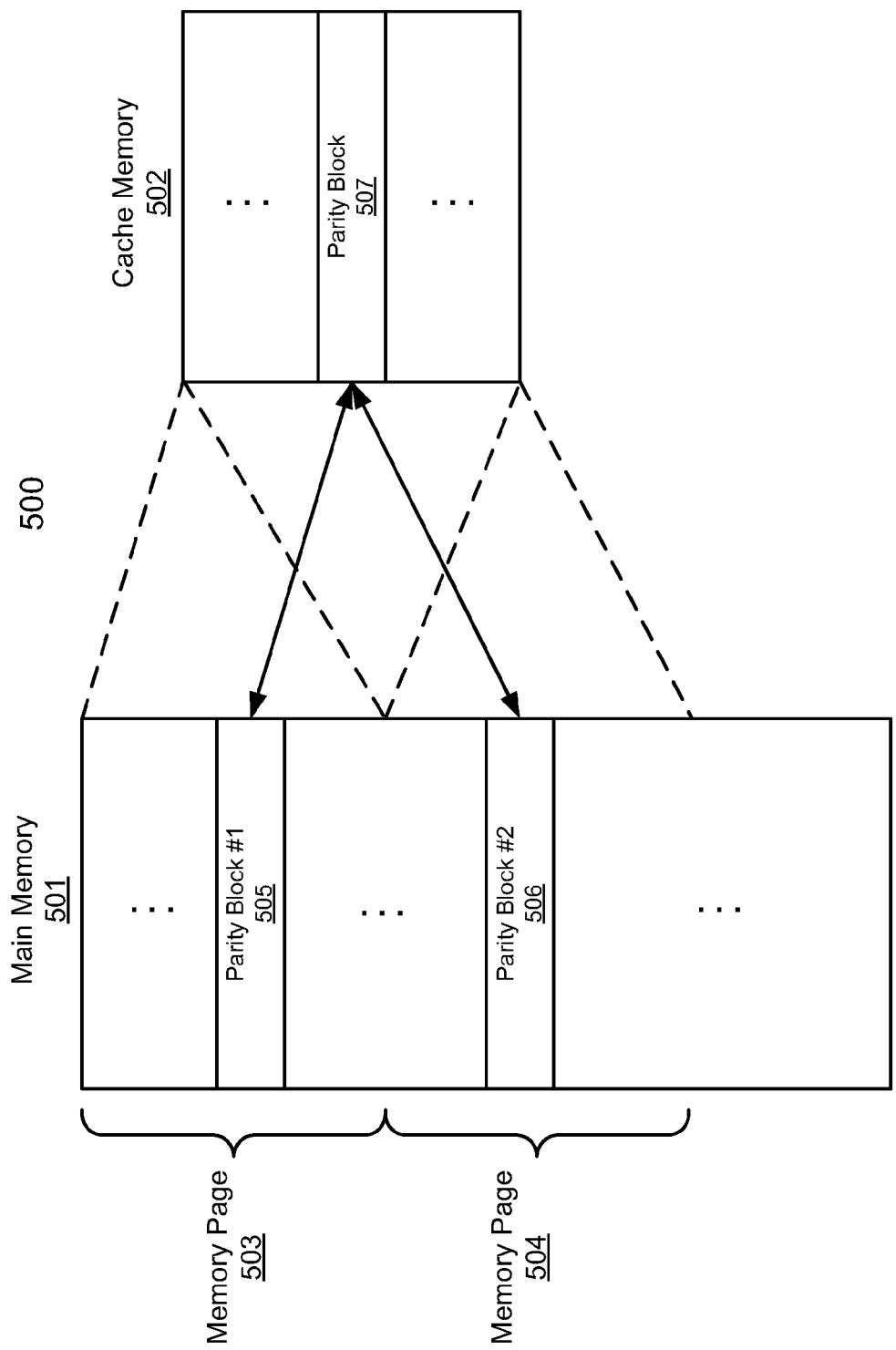
FIG. 5 is a block diagram illustrating a memory configuration of a data processing system according to one embodiment.

FIG. 5 is a block diagram illustrating a memory configuration of a data processing system according to one embodiment. Configuration 500 includes a main memory 501 and a cache memory 502. The main memory 501 may be implemented as a part of main memory 304 of FIG. 3. The cache memory 502 may be implemented as a part of cache memory 307 of FIG. 3. Cache memory 502 represents a segment of a cache memory that is mapped to a segment of main memory 501. In this example, it is assumed that cache memory 502 is mapped to segments 503-504. As described above, under the aliasing effects, certain memory addresses located within segments 503-504 are mapped to the same set of the cache memory 502.

In this example, it is assumed that memory addresses 505-506 are mapped to the same cache set 507, where the memory addresses 505-506 are an exact alias offset apart from each other. That is, if data is loaded from memory address 505, the data will necessarily go to cache set 507. Subsequently, if new data is loaded from memory address 506, the new data will also necessarily be stored in the cache set 507. By knowing what N-way associativity the cache has, we can know exactly how many aliased blocks can be held in a single cache set and we can control precisely when any one of our parity blocks will get evicted from the cache set by loading a new parity block. The rest of the data stored in the cache memory 502 is untouched as we have limited our cache pollution to the cache set 507.

According to one embodiment, when performing parity calculations, parity blocks are loaded into memory addresses that are exact alias offsets apart from each other (e.g., memory addresses 505 and 506), such that a subsequent parity block will necessarily be placed in cache set 507. After only a short series of parity blocks at aliased addresses, we will know that the entire cache set 507 is populated with parity blocks, and from that point on all further aliased parity block loads will necessarily evict an older parity block and not data from other applications, thereby reducing cache pollution of cache memory 502.

Figure 6:
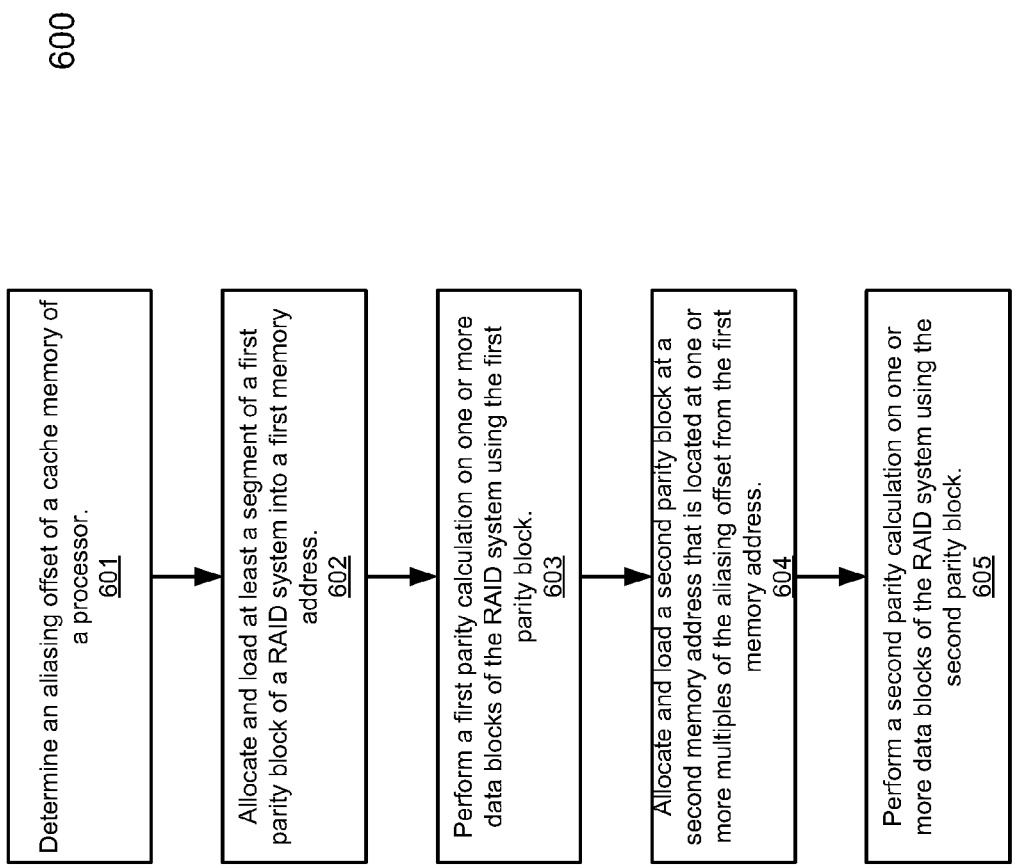
FIG. 6 is a flow diagram illustrating a method for performing parity calculations of RAID data according to one embodiment.

FIG. 6 is a flow diagram illustrating a method for performing parity calculations of RAID data according to one embodiment. Note that method 600 may be performed by processing logic which may include software, hardware, or a combination of both. For example, method 600 may be performed by a RAID stack of FIG. 1 or FIG. 3. Referring to FIG. 6, at block 601, an alias offset of a cache memory of a processor is determined, either statically or dynamically. At block 602, processing logic allocates and loads at least a segment (e.g., one or more bytes) of a first parity block of RAID data into a first memory address. At block 603, a first parity calculation is performed on one or more data blocks of the RAID data using the first parity block. At block 604, processing logic allocates and loads at least a segment of a second parity block at a second memory address that is located at one or more multiples of the alias offset from the first memory address. At block 605, a second parity calculation is performed on one or more data blocks and the second parity block. As a result, the first and second parity blocks are loaded into the same entry of the cache memory, reducing the pollution of the cache memory. In another embodiment, the system can preallocate known aliased offset parity blocks in memory at the early stages of the boot process and may hold onto those memory allocations for the entire time that the data processing machine is up and operational. It may then use those same parity blocks over and over again in order to avoid failure to allocate aliased addresses due to memory fragmentation.

Determination of Alias Offset of a Cache Memory

As described above, alias effects of the cache memory can be used to load parity blocks of RAID data to identical cache sets in order to reduce cache pollution. Additionally, it is important to know the alias offsets of the lowest levels of cache as the prefetch operations are sensitive to early cache eviction which would be heightened if our own actions added alias pressure to our prefetched data. Thus, if detailed cache information for all levels of cache are not available via the CPUID instruction or a static lookup table, it is important to accurately determine the alias offset of all levels of a cache memory. According to one embodiment, a test memory access routine is executed to load data into different memory locations and to time how long it would take to load such data.

Based on the timing of the different memory accesses, an alias offset of the cache memory can be determined at run time.

The basic idea is to use a very high resolution timer, such as a cycle counter of a processor, to time the latency incurred when we load a piece of data from main memory into cache for the first time. Then we can repeat the very same timed load on the same data again. This second time, we will get a different latency number, and that number will represent the lowest level of cache and should be our fastest data load latency. We can then run a series of load tests in a double loop, with one loop variable being the offset, and the second loop variable being the number of aliased reads to perform before rereading our original data. We can run the loop for all the common N-way values (ranging from 2-way to 8-way) and common alias offsets (ranging from 16 KB to 256 KB). For each loop iteration, we would perform a load of our original address to make sure it's still in cache, then perform N loads at different aliased offsets, then perform a reload of our original data and time the reload. If the reload time is now longer than our fastest reload time found above, then we have found our combination of N-way and alias values for our cache and have also found our higher level cache load time. However, as it's possible for a 4-way, 32 KB cache to trigger positive on the 8-way, 16 KB test, the loops must be performed from largest alias size to smallest, and from highest associativity to smallest as well. This will avoid false positives in the testing process.

Once the N-way and alias offset of the lowest level cache have been determined, the test can be rerun with the values substituted with ones that are common for higher level caches. In order to differentiate between the lowest level and highest level caches, it is necessary to not stop simply whenever the load time of the original data rises above our fastest load time, but it must rise above the higher level cache load time that we discovered in 0073. On multicore processors with an additional level of cache it is possible we will need to perform this same test sequence one additional time. Whether or not our load time in this test rose all the way to our original memory load time would determine if there is another layer of cache to be concerned with.

This will allow a user to find the cache alias for any given processor and allow the user (e.g., program) to allocate known cache aliased memory. As a result, parity blocks of RAID data for parity calculations can be precisely loaded at an aliasing bound of the cache memory thereby reducing unnecessary polluting of the cache memory.

Figure 7:
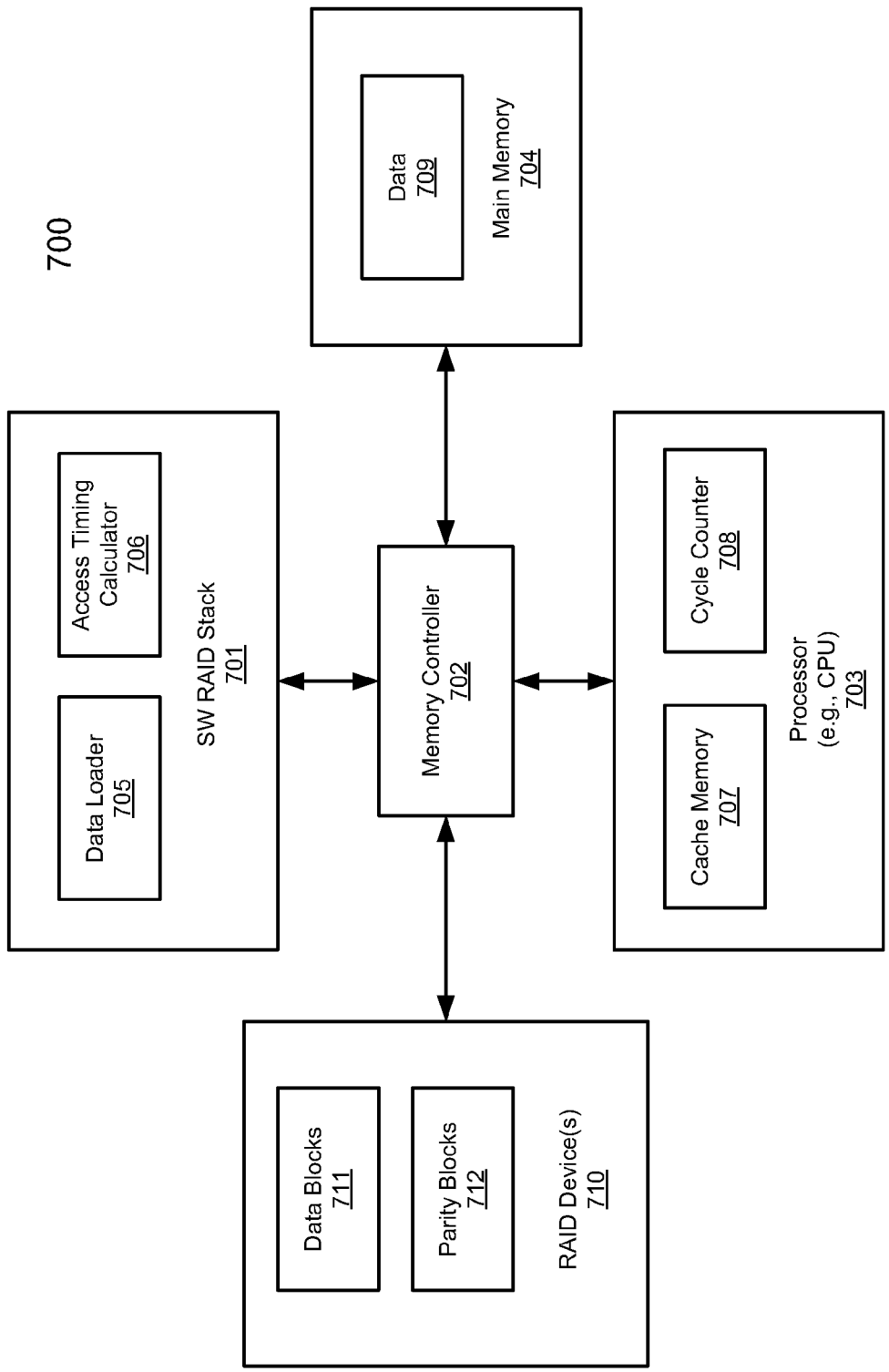
FIG. 7 is a block diagram illustrating a system for determining alias offsets of a cache memory of a data processing system according to one embodiment.

FIG. 7 is a block diagram illustrating a system for determining alias offsets of a cache memory of a data processing system according to one embodiment. System 700 may be implemented as a part of system 100 as shown in FIG. 1. Referring to FIG. 7, system 700 includes a software RAID stack 701, processor 703, main memory 704, and storage device 710 coupled to each other via a memory controller 702 by one or more buses or interconnects. Similar to system 100 of FIG. 1, RAID device 710 is used to store data blocks 711 and parity blocks 712 of RAID data. Any of data blocks 711 and parity blocks 712 can be loaded into main memory 704 as data 709 via the memory controller 702. When data is loaded from memory 704 into a register of processor 703 (not shown), a copy of the data is stored in the cache memory 707.

According to one embodiment, RAID stack 701 includes a data loader 705 and an access timing calculator 706. The data loader 705 is configured to load first data into a first memory address of main memory 704, which will also be stored in cache memory 707. The timing calculator 706 accesses (e.g., via API) cycle counter 708 of processor 703 to determine how many processor (e.g., CPU) cycles to take in order to load the first data. Data loader 705 then loads multiple items of data from suspected aliased memory addresses. The first data is reloaded again at the first memory address. The timing of reloading the first data is measured by reading the cycle counter 708. If the first data is still in the cache memory 707, the reloading of the first data will be much faster than it was the first time (e.g., less number of cycles to reload the first data). The above process repeats by incrementing the number of suspected aliased memory items read up to the limit of common N-way associative caches, then adjusting the suspected alias offset and resetting the number of aliased memory items to read and performing the loop again until a reread of the original memory address no longer happens at the faster speed.

Once the N-way associativity and alias offset of the cache memory have been identified, loading N items at the proper alias offset will always result in the original data item being evicted from cache memory 707. The determined alias offset can be verified by performing the test as described above repeatedly to ensure that external factors did not influence the cache memory and therefore the results of the test. Note that some or all of the components as shown in FIG. 7 may be implemented in software, hardware, or a combination of both. More or fewer components may also be implemented.

Figure 8:
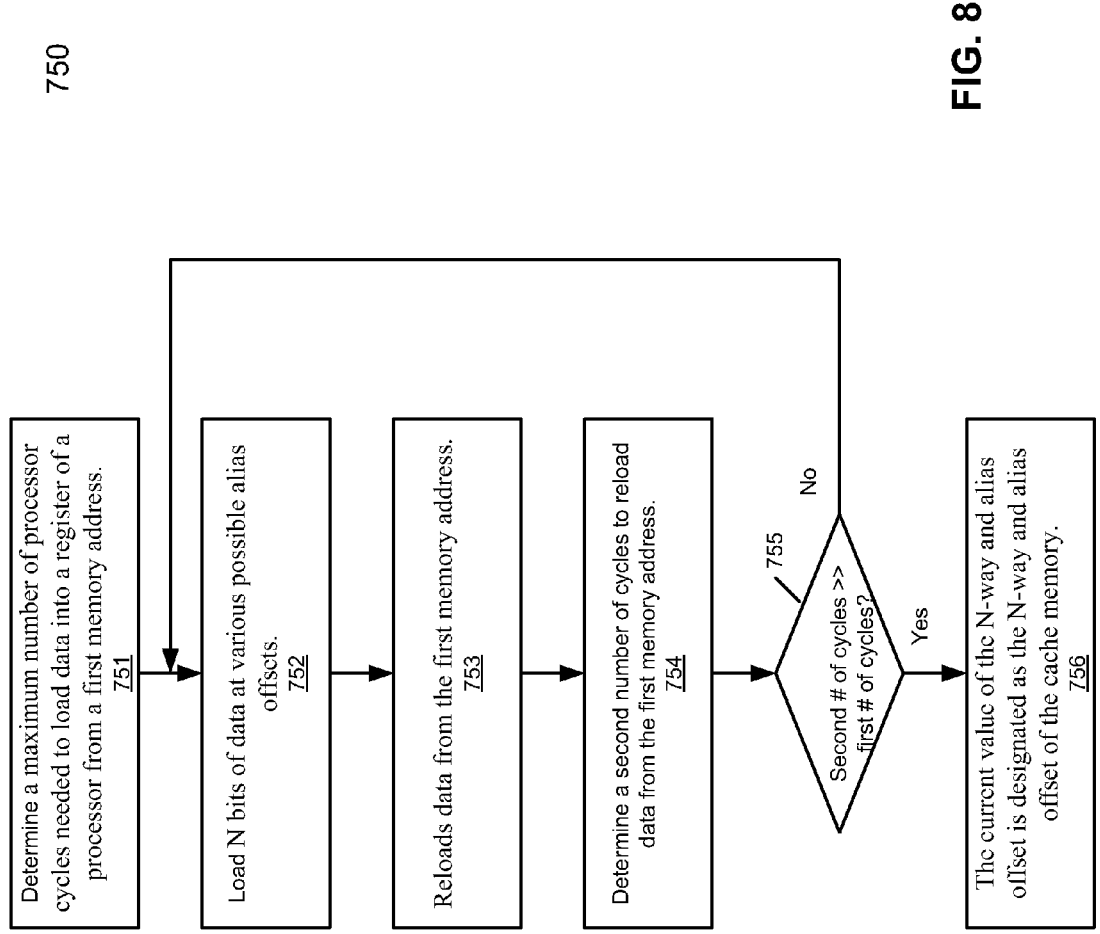
FIG. 8 is a flow diagram illustrating a method for determining an alias offset of a cache memory according to one embodiment.

FIG. 8 is a flow diagram illustrating a method for determining an alias offset of a cache memory according to one embodiment. Note that method 750 may be performed by processing logic which may include software, hardware, or a combination of both. For example, method 750 may be performed by RAID stack 701 of FIG. 7. Referring to FIG. 8, at block 751, processing logic determines a maximum number of processor cycles needed to load data into a register of a processor from a first memory address of a main memory that is not current in any level of cache memory. In order to verify that the right number has been achieved, a number of loads from random memory locations should be performed and the longest typical load time considered the correct number. After an initial load time is determined, the first memory address should be reloaded and retimed. This reload should show a significant drop in load time. If so, then we have both a correct time to load the data from main memory and a correct time to load the data from cache memory. If not, we should pick a new starting memory address and try again until we find one that wasn't cached when we first loaded it and is cached afterwards. At block 752, processing logic enters a loop to load N bits of data at various possible alias offsets. At block 753, processing logic reloads data from the first memory address and at block 754, processing logic determines a second number of processor cycles to reload data from the first memory address.

At block 755, it is determined whether the second number of processor cycles is significantly greater than previously recorded time to load the first data from cache memory. If not, that means that the proper N-way and alias combination have not yet been found and at block 757, we select another N-way and alias offset combination and the above operations repeat. If at block 755 the second number of processor cycles is significantly larger than the saved value for a load from cache memory, it means that the data previously loaded at the first memory address has been evicted from the cache by the set of data loaded in our test loop. Thus, at block 756, the current value of the N-way and alias offset is designated as the N-way and alias offset of the cache memory.

While the most common method of set association is the one portrayed in the test logic in FIG. 8, there are other alternative means of handling set associativity in cache memory. The logic in FIG. 8 represent one embodiment as required by the common method of set associativity, but the invention is not limited to that particular embodiment.

Figure 9:
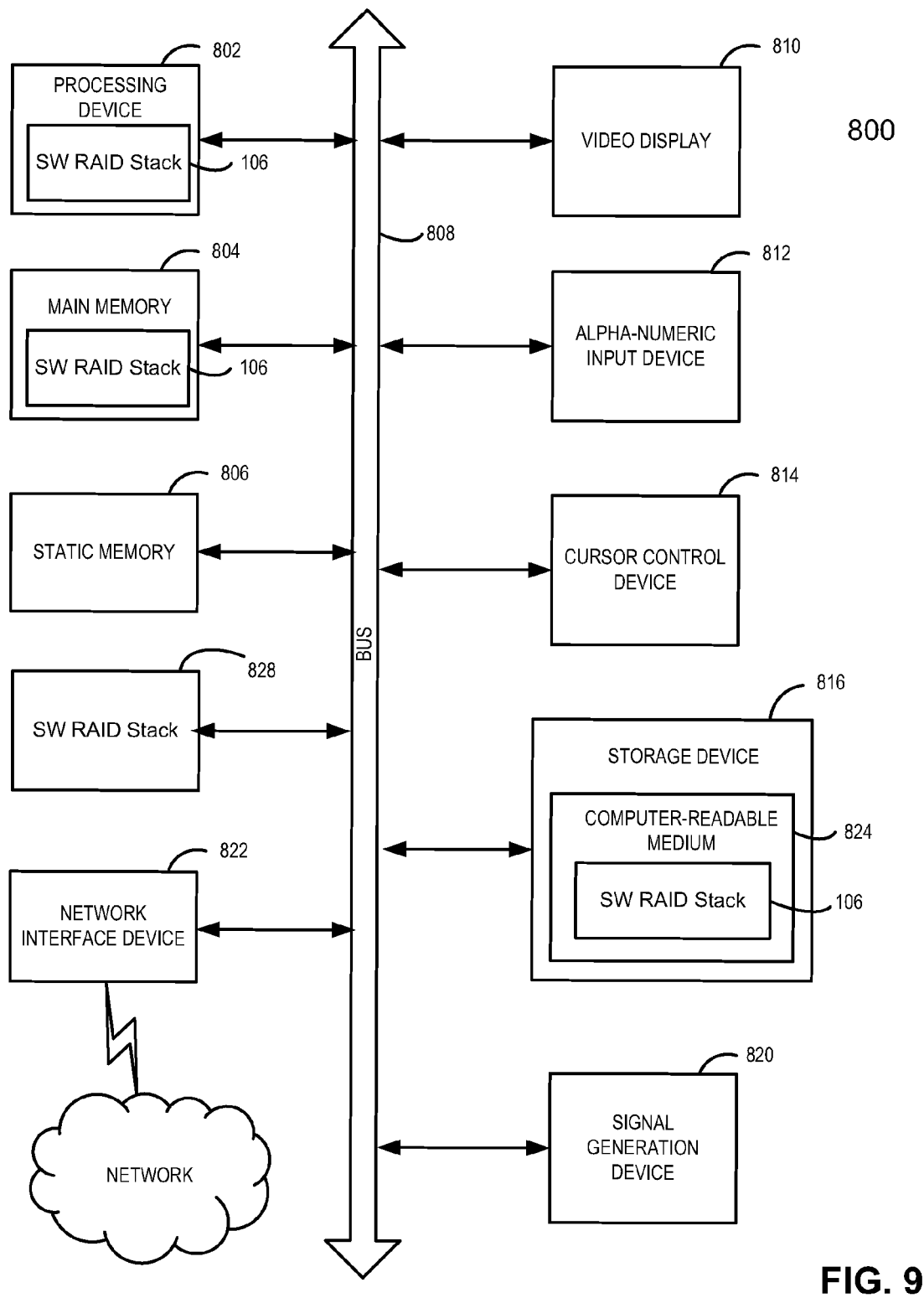
FIG. 9 illustrates a diagrammatic representation of a machine in the exemplary form of a computer system which may be used with an embodiment.

FIG. 9 illustrates a diagrammatic representation of a machine in the exemplary form of a computer system 800 within which a set of instructions, for causing the machine to perform any one or more of the methodologies discussed herein, may be executed. In alternative embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 800 includes a processing device 802, a main memory 804 (e.g., read-only memory (ROM), flash memory, dynamic random access memory (DRAM) such as synchronous DRAM (SDRAM), etc.), a static memory 806 (e.g., flash memory, static random access memory (SRAM), etc.), and a data storage device 816, which communicate with each other via a bus 808.

Processing device 802 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 is configured to execute the instructions 106 for performing the operations and steps discussed herein.

The computer system 800 may further include a network interface device 822. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 820 (e.g., a speaker).

The data storage device 816 may include a computer-accessible storage medium 824 (also known as a machine-readable storage medium or a computer-readable medium) on which is stored one or more sets of instructions or software (e.g., RAID stack 106) embodying any one or more of the methodologies or functions described herein. The RAID stack 106 may also reside, completely or at least partially, within the main memory 804 and/or within the processing device 802 during execution thereof by the computer system 800, the main memory 804 and the processing device 802 also constituting machine-accessible storage media. The RAID stack 106 may further be transmitted or received over a network via the network interface device 822.

The computer-readable storage medium 824 may also be used to store the RAID stack 106 persistently. While the computer-readable storage medium 824 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The modules 828, components and other features described herein can be implemented as discrete hardware components or integrated in the functionality of hardware components such as ASICS, FPGAs, DSPs or similar devices. In addition, the modules 828 can be implemented as firmware or functional circuitry within hardware devices. Further, the modules 828 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "loading" or "performing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable medium. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices), etc.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description above. In addition, embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of embodiments of the invention as set forth in the following claims. The specification and drawings are, accordingly, to be regarded in an illustrative sense rather than a restrictive sense.

What is claimed is:

1. A computer-implemented method for performing parity calculations, the method comprising:
    loading, by a redundant array of independent disk (RAID) stack, a parity block of RAID data from a main memory into the highest level of cache of a processing device as well as a register of a processing device;
    loading, by the RAID stack, a first data block of the RAID data from the main memory into the lowest allowed level of cache memory and optionally into a register of the processing device without loading the first data block into the highest level cache memory of the processing device; and
    performing, by the processing device, a first parity calculation based on the parity block and the first data block.

2. The method of claim 1, optionally further comprising:
    loading, by the RAID stack, an additional data block of the RAID data from the main memory into the lowest allowed level of cache memory and optionally into a register of the processing device without loading the additional data block into the highest level cache memory of the processing device; and
    performing, by the processing device, an additional parity calculation based on the additional parity block and the result of the previous xor operation stored in the parity block.

3. The method of claim 2, wherein the additional parity calculations are performed without reloading the parity block from the main memory.

4. The method of claim 1, further comprising receiving by the RAID stack a request for writing the RAID data from a file system, wherein the first parity calculation is performed in response to the request.

5. The method of claim 4, wherein the RAID stack is configured to communicate with a storage device driver to access a RAID storage device storing the RAID data, in order to write the first data block and the parity block to the RAID storage device from main memory.

6. The method of claim 1, wherein the RAID stack is implemented as a component of an operating system executed in the main memory by the processing device.

7. The method of claim 1, wherein the first data block is loaded using a PREFETCHNTA; MOVAPS; instruction sequence and the parity block is loaded using a plain MOVAPS instruction.

8. A computer readable non-transitory storage medium including instructions that, when executed by a processing system, cause the processing system to perform a method for parity calculations, the method comprising:
    loading, by a redundant array of independent disk (RAID) stack, a parity block of RAID data from a main memory into the highest level of cache of a processing device as well as a register of a processing device;
    loading, by the RAID stack, a first data block of the RAID data from the main memory into the lowest allowed level of cache memory and optionally into a register of the processing device without loading the first data block into the highest level cache memory of the processing device; and
    performing, by the processing device, a first parity calculation based on the parity block and the first data block.

9. The computer readable storage medium of claim 8, wherein the method further comprises:
    loading, by the RAID stack, an additional data block of the RAID data from the main memory into the lowest allowed level of cache memory and optionally into a register of the processing device without loading the additional data block into the highest level cache memory of the processing device; and
    performing, by the processing device, an additional parity calculation based on the additional parity block and the result of the previous xor operation stored in the parity block.

10. The computer readable storage medium of claim 9, wherein the second parity calculation is performed without reloading the parity block from the main memory.

11. The computer readable storage medium of claim 8, wherein the method further comprises receiving by the RAID stack a request for writing the RAID data from a file system, wherein the first parity calculation is performed in response to the request.

12. The computer readable storage medium of claim 11, wherein the RAID stack is configured to communicate with a storage device driver to access a RAID storage device storing the RAID data, in order to write the first data block and the parity block to the RAID storage device from main memory.

13. The computer readable storage medium of claim 8, wherein the RAID stack is implemented as a component of an operating system executed in the main memory by the processing device.

14. The computer readable storage medium of claim 8, wherein the first data block is loaded using a PREFETCHNTA; MOVAPS; instruction sequence and the parity block is loaded using a plain MOVAPS instruction.

15. A system, comprising:
    a processing device;
    a main memory coupled to the processing device; and
    a redundant array of independent disk (RAID) stack executed from the main memory to cause the processing device to
        load a parity block of RAID data from a main memory into the highest level of cache of a processing device as well as a register of a processing device;
        load a first data block of the RAID data from the main memory into the lowest allowed level of cache memory and optionally into a register of the processing device without loading the first data block into the highest level cache memory of the processing device; and performing, by the processing device, a first parity calculation based on the parity block and the first data block.

16. The system of claim 15, wherein the RAID stack further causes the processing device to load an additional data block of the RAID data from the main memory into the lowest allowed level of cache memory and optionally into a register of the processing device without loading the additional data block into the highest level cache memory of the processing device; and performing, by the processing device, an additional parity calculation based on the additional parity block and the result of the previous xor operation stored in the parity block.

17. The system of claim 16, wherein the second parity calculation is performed without reloading the parity block from the main memory.

18. The system of claim 15, wherein the RAID stack receives a request for writing the RAID data from a file system, wherein the first parity calculation is performed in response to the request.

19. The system of claim 18, further comprising a RAID storage device, wherein the RAID stack is configured to communicate with a storage device driver to access the RAID storage device storing the RAID data, in order to load the first data block and the parity block to the main memory from the RAID storage device.

20. The system of claim 15, wherein the RAID stack is implemented as a component of an operating system executed in the main memory by the processing device.

21. The system of claim 15, wherein the first data block is loaded using a MOVQW instruction and the parity block is loaded using a MOVNTQW instruction.

* * * * *